Oct. 1, 1929.  J. H. GRAYBILL  1,729,871

VOLTAGE RELAY

Filed Feb. 17, 1928

INVENTOR
John H. Graybill
BY
Chesley G. Carr
ATTORNEY

Patented Oct. 1, 1929

1,729,871

UNITED STATES PATENT OFFICE

JOHN H. GRAYBILL, OF FOREST HILLS, PENNSYLVANIA, ASSIGNOR TO WESTINGHOUSE ELECTRIC & MANUFACTURING COMPANY, A CORPORATION OF PENNSYLVANIA

VOLTAGE RELAY

Application filed February 17, 1928. Serial No. 255,057.

This invention relates generally to control systems for electric motors and particularly to low voltage protection for control systems.

In protective systems in which a magnet is employed to retain the switch member in its circuit closing position, there is quick response to an interruption of the power supply. When such a quick acting protective device is connected in a motor circuit, the motor is almost instantaneously disconnected from the power source upon the failure of power, and every time the power supply is interrupted, the process of starting the motor has to be repeated.

The periods during which a low voltage condition or an interruption of power exist in a supply line are quite often of such short duration that motors connected to the line do not decelerate noticeably before re-application of the power occurs. Ordinarily, the momentum of the motor and the driven machinery is great enough to cause the motor to continue its rotation for a period of time after interruption of the power, and the power may be re-applied before the motor has decelerated to a speed at which re-application of full voltage would damage the windings. In this way, re-starting through the accelerating periods is avoided when only momentary interruption of the power exists. If, however, the low voltage condition exists after the motor has decelerated to a speed at which re-application of the full voltage would injure the motor windings, the motor will be disconnected from the line so that upon the re-application of the voltage, the motor and the driven machinery must be started through the usual accelerating steps.

The object of the invention, generally stated, is to provide a safe and reliable method for protecting electric motors from low voltage conditions, which may arise in the power circuit.

A more specific object of the invention is to provide a low voltage protective system for motors which will permit a motor to resume operation should the normal voltage be re-applied before a predetermined period of time has elapsed after its interruption.

Another object of the invention is to provide a low voltage protective system for electric motors, wherein power may be re-applied directly to a motor for a period of time after power interruption, but after the expiration of such period of time requiring the motor to be started through the accelerating steps.

Figure 1:
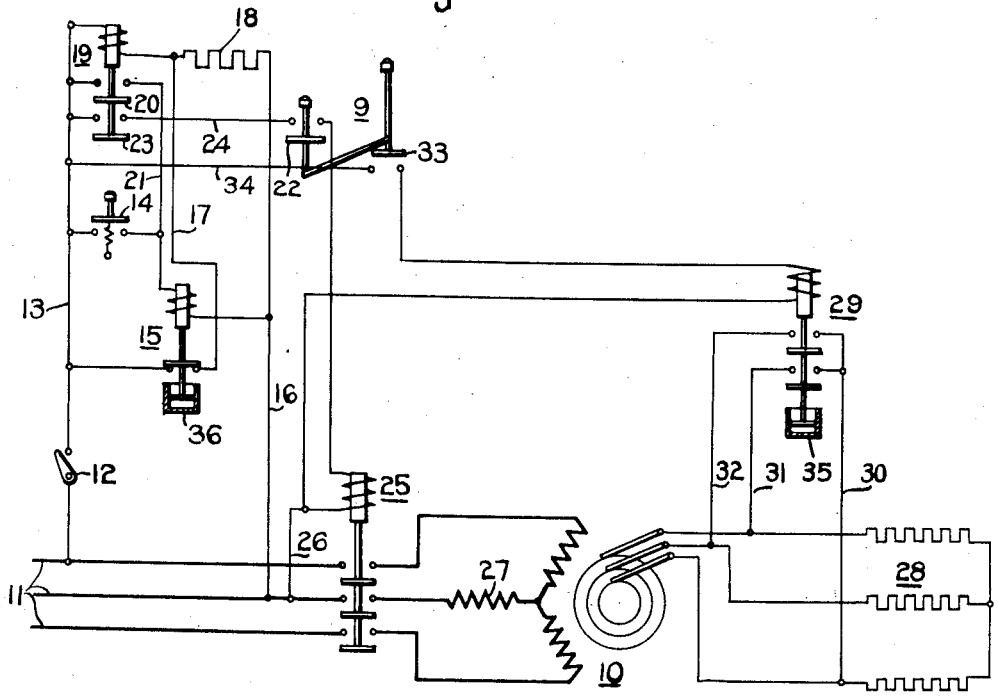
Figure 2:
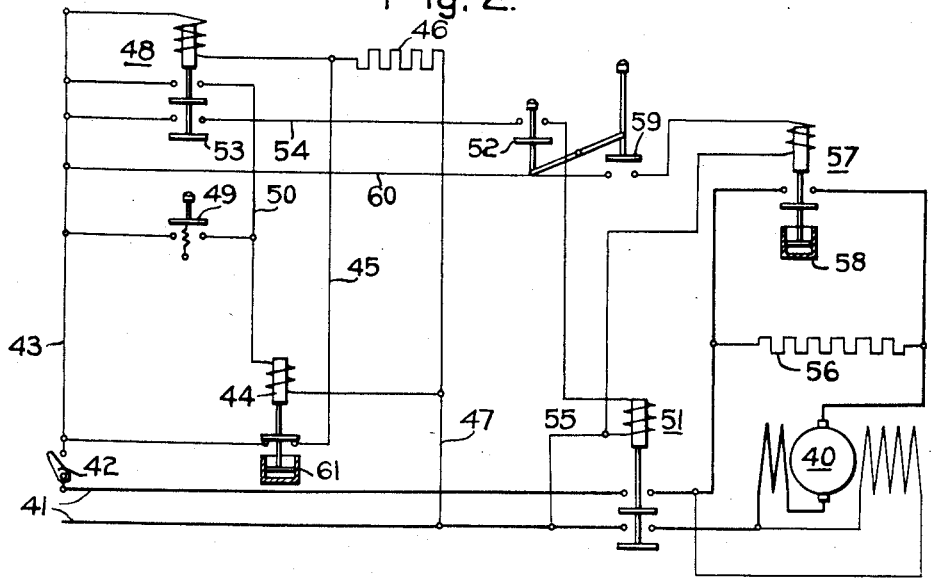

Other objects of the invention will be apparent to those skilled in the art when the following description is read in conjunction with the diagrams, in which;

Figure 1 is a diagram of a control system which shows the invention adapted to an induction motor, and Fig. 2 is a diagram of the invention as adapted to a control system for a direct current motor.

Referring now to Figure 1, the induction motor 10 is disposed to be connected to the supply line 11. As shown, a line switch 25 is provided for controlling the motor circuit.

The operation of the line switch 25 is governed by the low-voltage relay 19, the delayed-action relay 15 and the push-button switch 14. The function of the different members utilized in governing the operation of the motor will be set forth hereinafter. As is common practice, a manually operable switch 12 is connected in the control circuit to permit its interruption at any time by an operator. After the switch 12 is closed in order to start the motor, the push-button switch 14 may be depressed to its circuit-closing position, completing a circuit which extends from the energized conductor 13 through push button switch 14, the operating coil of relay 15, and conductor 16 to the supply line 11. Upon the completion of this circuit, the operating coil of the relay 15 is energized and the relay 15 is actuated to its open position.

It will be noted from the diagram that the relay 15, when in its closed or deenergized position, completes a circuit that may be traced from the energized conductor 13 through the relay 15, conductor 17, resistor 18, and conductor 16 to the supply line 11. As shown, the circuit through the relay 15 constitutes a shunt around the operating coil of the low voltage relay 19, so that until this circuit is opened through the actuation of relay 15, to its open position, it is impossible to energize the operating coil of the low voltage relay 19 and actuate the low voltage relay 19 to its circuit closing position.

When the relay 15 is in its open position, a circuit is completed which extends from the energized conductor 13 through the operating coil of low voltage relay 19, the resistor 18, and conductor 16 to the supply line 11. Therefore, the low voltage relay 19 is closed, and a circuit is established that leads from the energized conductor 13 through the contact member 20 of low voltage relay 19, conductor 21 to the operating coil of relay 15, by conductor 16 to the supply line 11.

It will be noted that the last traced circuit parallels the push-button switch 14 and the latter may be released without interrupting the energizing circuit of the relay 15 and allowing it to return to its circuit-closing position.

The protective relays being in their operating positions, the main control circuits may now be closed to initiate connection between the induction motor 10 and the supply line 11. The starting push-button switch shown generally at 9 may now be actuated to close the contact members 22 and establish a circuit extending from the energized conductor 13 through contact member 23 of low voltage relay 19 (in its closed position) conductor 24, contact member 22 to the operating coil of the line switch 25 and conductor 26 to the supply line 11. In such manner the magnetic switch 25 is actuated to its closed position, and the primary winding 27 of the induction motor 10 is connected across the line 11.

In order to accelerate the induction motor 10 from rest to its operating speed, a resistor 28 is provided which may be short circuited when the motor has been accelerating for a predetermined period of time. This short circuiting operation is accomplished through the actuation of the switch 29 which, when actuated to its closed position, connects the conductors 30, 31 and 32, and short-circuits the secondary winding of the induction motor 10.

The operating coil of the magnetically operated accelerating switch 29 is energized by a circuit which extends through contact member 33 of the starting push-button switch 9 upon its actuation to its closed position to complete the circuit to the operating coil of the main switch 25. The circuit to the operating coil of switch 29 may be traced from the energized conductor 13 through conductor 34, contact member 33, the operating coil of switch 29 and conductor 26 to the supply line 11.

It will be seen that the operating coil of switch 29 is energized simultaneously with the operating coil of switch 25. However, the switch 29 is provided with a retarding device such as a dash pot 35 which causes a predetermined period of time to elapse between the initial energization of the operating coil of switch 29 and the final closure of its contact members. During the period of time between the energization of the operating coil of switch 29 and the closure of its contact members, the induction motor 10 is allowed to accelerate with its secondary winding connected through the resistors 28.

When it is desired to stop the operation of the induction motor 10, the starting push-button switch 9 may be actuated in the opposite direction from its previous operation so that contact members 22 and 33 are forced into their circuit interrupting positions, thereby interrupting the circuits through the operating coils of the line switch 25 and the accelerating switch 29, and allowing these switches to be released to their circuit interrupting positions. Thus, the primary winding 27 of the induction motor 10 is disconnected from the source of supply through the operation of switch 25, and switch 29 is released to its open position so that the motor may again be started from rest with its secondary winding connected through the resistors 28.

It often happens when the induction motor 10 is connected to the supply line 11 and operating with its secondary winding short-circuited, that a low voltage condition arises or a complete interruption of power occurs so that the induction motor 10 will decelerate and should it come to rest with the main switch 25 remaining in its closed position, a re-application of power will cause damage to the windings of the motor 10 as well as create undesirable shocks upon the machinery which it may be driving.

The operating coil of the low voltage relay 19 is so designed that when the voltage across its terminals reaches a predetermined low value, its armature will be released to open the circuits through the contact members 20 and 23, thereby interrupting the energizing circuits of the switch 25 and relay 15. The switch 25 drops open and the relay 15 begins its downward travel. This operation of the relay 15 is, however, retarded by any suitable device such as the dash pot 36 so that a definite period of time is required after interruption of the circuit through its operating coil before the completion of the circuit through its contact member may be effected. It will be noted that when the relay 15 stands in its circuit closing position, the push-button switch 14 must be actuated to complete a circuit through the operating coil of the relay 15 and cause the relay 15 and the low voltage relay 19 to assume their circuit-closing positions before the main switch 25 can be actuated to its closed position. If full voltage should be restored to the line before the relay 15 has reached its circuit clos- When it is desired to disconnect the motor 40 from the supply line 41, and thereby stop the operation of the motor 40, the starting push-button switch may be operated in its reverse direction, interrupting the circuit through contact member 52 which supplies energy to the operating coil of the main switch 51. Upon the interruption of this circuit, the operating coil of switch 51 will be deenergized and its armature will be released, interrupting the circuit between the supply line 41 and the motor 40.

If an abnormal condition arises in the power system, such as a complete failure of power, or the existence of a low voltage condition while the motor 40 is operating, then the low voltage relay 48 will respond to the condition of the power system and the motor 40 will be disconnected from the supply line 41. When the supply line voltage is reduced to a predetermined value, the armature of the low voltage relay 48 is released and the circuit to the operating coil of the main switch 51 thereby broken by contact member 53, thus releasing the armature of the magnetically operated switch 51 and disconnecting the motor 40 from the supply line 41. Upon the release of the armature of the low voltage relay 48, the circuit which supplies energy to the operating coil of relay 44 is also interrupted so that the armature of relay 44 is released and begins its travel toward its circuit closing position. The relay 44 is provided with a suitable retarding device such as the dash pot 61 which causes a definite period of time to elapse between the deenergization of the operating coil and the closure of the contact members to the relay 44.

If power is restored to the supply line 41 before the armature of relay 44 has reached its circuit closing position, (where it short-circuits the operating coil of low voltage relay 48) the low voltage relay 48 will immediately respond to the restored power and close the energizing circuit for the main switch 51 as described hereinbefore. The switch 51 will then be actuated to its closed position and the motor 40 again connected to the supply line 41. Upon the reclosure of the low voltage relay 48, another circuit is completed which reenergizes the operating coil of relay 44 and again actuates the relay 44 to its open position.

If the interruption of the power supply is of greater duration than the period of time required for the relay 44 to descend to its circuit closing position after deenergization of its operating coil, the operating coil of the low voltage relay 48 is short circuited. It is then impossible to reconnect the motor 40 to the supply line 41 without first resetting the relays 44 and 48 by closing the circuit through the push-button switch 49 as described in connection with the starting of the motor 40.

The motor 40 may then be restarted through its accelerating periods as described.

Since it is possible to modify the invention described, and adapt it to numerous applications without departing from the spirit and scope of the invention, it is desired that the embodiments set forth be construed as entirely descriptive and not in a limiting sense.

I claim as my invention:

1. In a motor control system, in combination a source of power supply, a motor, a line switch for connecting the motor to the source of power, an actuating circuit for the line switch, a low-voltage relay provided with an operating coil for controlling the line switch actuating circuit, a time-element relay connected in shunt of the actuating coil of the low-voltage relay to prevent operation of the low-voltage relay, means for actuating the time-element relay to interrupt the shunt of the low-voltage relay coil, and means controlled by the low-voltage relay when energized for retaining the time-element relay in its shunt interrupting position.

2. In combination with a source of supply, a control system for an electric motor comprising an electromagnetic switch for connecting the motor to the source of supply, said switch being provided with an operating coil, an electromagnetic relay for controlling the operation of said switch, said relay being disposed upon the occurrence of predetermined low voltage to interrupt the supply of energy to the operating coil of the electromagnetic switch and allow said switch to be released to its circuit interrupting position, said electromagnetic relay having an operating coil disposed, when energized, to retain the relay in its circuit closing position, and to release the relay to its circuit interrupting position upon the occurrence of a predetermined low voltage, and means for short circuiting said relay operating coil upon the lapse of a predetermined interval of time after the occurrence of a low voltage condition.

3. The combination with a source of supply and an electric motor, of a control system for the motor comprising a switch disposed to connect the motor to the source of supply, a low-voltage relay disposed to be responsive to fluctuations of the supply voltage, said low-voltage relay being disposed to control the operation of the switch and to move to its circuit interrupting position upon the occurrence of voltage below a predetermined value; said low-voltage relay adapted to be reclosed upon the recurrence of normal voltage at the source of supply, a time-element relay having an operating coil, said operating coil being disposed to be disconnected from the source of supply upon the opening of said low-voltage relay, thereby releasing the time-element relay, said timeing position, the low voltage relay 19 will be immediately picked up and the original running connections restored.

The period of time required for the relay 15 to reach its lower position after interruption of its energizing circuit may be varied by adjustment of the retarding device 36 so that the period of time allowed will be insufficient to allow the induction motor 10 to decelerate to a speed at which re-application of the full voltage would endanger its windings. It will be readily understood that, should a momentary failure of power occur and if the induction motor 10 is not decelerated to a speed below which it will be harmful to have power re-applied to its primary windings 27, the low voltage relay 19, although having caused the induction motor 10 to be disconnected from the supply line 11 will immediately respond to the restored power and actuate the switch 25 connecting the primary winding 27 directly to the supply line 11. The necessity of starting the induction motor 10 through its normal accelerating steps is thereby eliminated when only a momentary failure of power occurs.

Assuming that the supply of power is interrupted for a period of time greater than that for which the retarding device of the relay 15 is adjusted, then the relay 15 will have reached its circuit-closing position before restoration of the power, thereby short circuiting the operating coil of the low voltage relay 19 and preventing it from being actuated upon the restoration of the power supply. Therefore, when the failure of power is for a predetermined period, the only manner in which the motor may be re-started is in accordance with the method hereinbefore described.

Referring now to Figure 2, which illustrates how the system may be utilized to control the operation of the motor 40 from the direct current supply line 41. In order to connect the motor 40 to the supply line 41, the control circuits must first be energized by actuating the control switch 42 to its closed position and thereby energizing the conductor 43. Upon the closure of the control switch 42, a circuit is completed from the energized conductor 43 through the contact member of relay 44, conductor 45, resistor 46, and by conductor 47 to the supply line 41. It will be noted from the diagram that this circuit, through the contact member of relay 44 and the conductor 45, short circuits the operating coil of the low voltage relay 48.

In order to actuate the relay 44 to its open position, the push-button switch 49 is actuated into its closed position to complete a circuit from the energized conductor 43 through push-button switch 49, the operating coil of relay 44, and conductor 47 to the supply line 41. The operating coil of the relay 44 being energized, the relay is actuated to its open position, interrupting the circuit paralleling the operating coil of the low voltage relay 48 and allowing power to be applied to the operating coil of the low voltage relay 48.

The operating coil of the low voltage relay 48 is designed to respond to voltages of a predetermined value across its terminals. Assume now that such a predetermined voltage is applied to the terminals of the operating coil of low voltage relay 48, then the armature is actuated to its circuit closing position, establishing a circuit from the energized conductor 43, through contact member 49 of low voltage relay 48, conductor 50, the operating coil of relay 44, and conductor 47 to the supply line 41, thereby providing a path parallel to the push-button switch 49 so that the push-button switch 49 may be released without interrupting the energizing circuit of the relay 44.

When the protective relays 44 and 48 stand energized, the motor 40 may be connected through the main line switch 51 to the supply line 41. In order to close switch 51, the starting push-button switch is actuated to close the contact member 52 and thereby establish a circuit from the energized conductor 43 through contact member 53 of the low voltage relay 48, (in its closed position) conductor 54, contact member 52, the operating coil of the magnetically operated switch 51, and conductor 55 to the supply line 41, thereby energizing the operating coil of switch 51 and actuating its armature to close the contact members connecting the motor 40 to the supply line 41.

Upon connecting the motor 40 to the supply line 41, it is not desired that the full line voltage be impressed across the terminals of the motor 40 and for this reason the resistor 56 is connected in series with the armature of motor 40 while the motor is accelerating. After the motor 40 has attained sufficient speed to permit the impression of the full line voltage across its terminals without endangering the windings, the starting resistor 56 may be short-circuited through the accelerating switch 57.

The accelerating switch 57 is provided with a suitable retarding device such as the dash pot 58, so that a period of time elapses between the energization of the operating coil and the closure of the contact members of the accelerating switch 57. It will be noted from the diagram that a circuit is completed to the operating coil of switch 57 by closure of the contact member 59 upon the actuation of the starting push-button switch to its closed position. The circuit which supplies energy for operating the switch 57 may be traced from the energized conductor 43 through conductor 60, contact member 59, the operating coil of switch 57 and conductor 55 to the supply line 41.

element relay being provided with means for causing the lapse of a predetermined period of time between the deenergization of its operating coil and the attainment of its fully released position, said time-element relay being disposed, when in its fully released position, to short-circuit the operating coil of the low-voltage relay and thereby prevent reclosure of the low-voltage relay upon reapplication of normal supply voltage, and means for resetting the relays to allow operation of the motors.

In testimony whereof, I have hereunto subscribed my name this 7th day of February, 1928.

JOHN H. GRAYBILL.